Dec. 17, 1963     H. C. WINTZER     3,114,415
SHELL AND TUBE HEAT EXCHANGERS
Filed Feb. 15, 1957
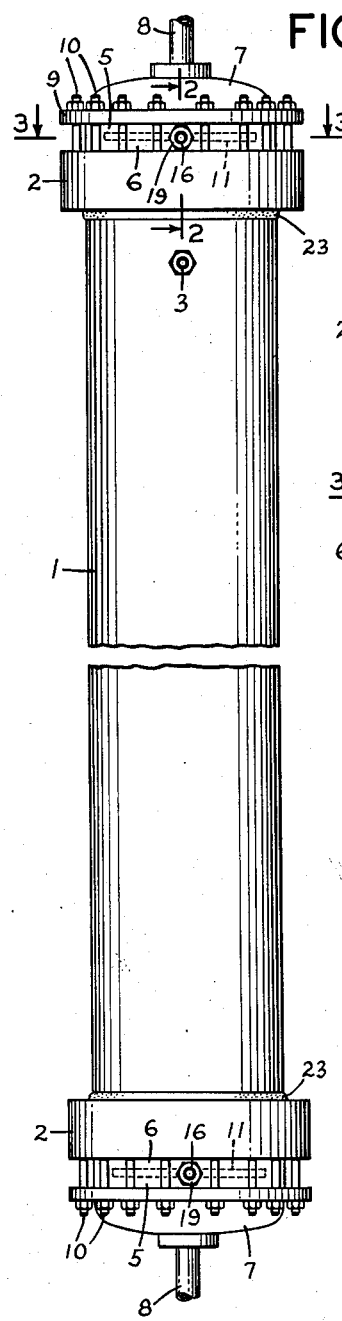
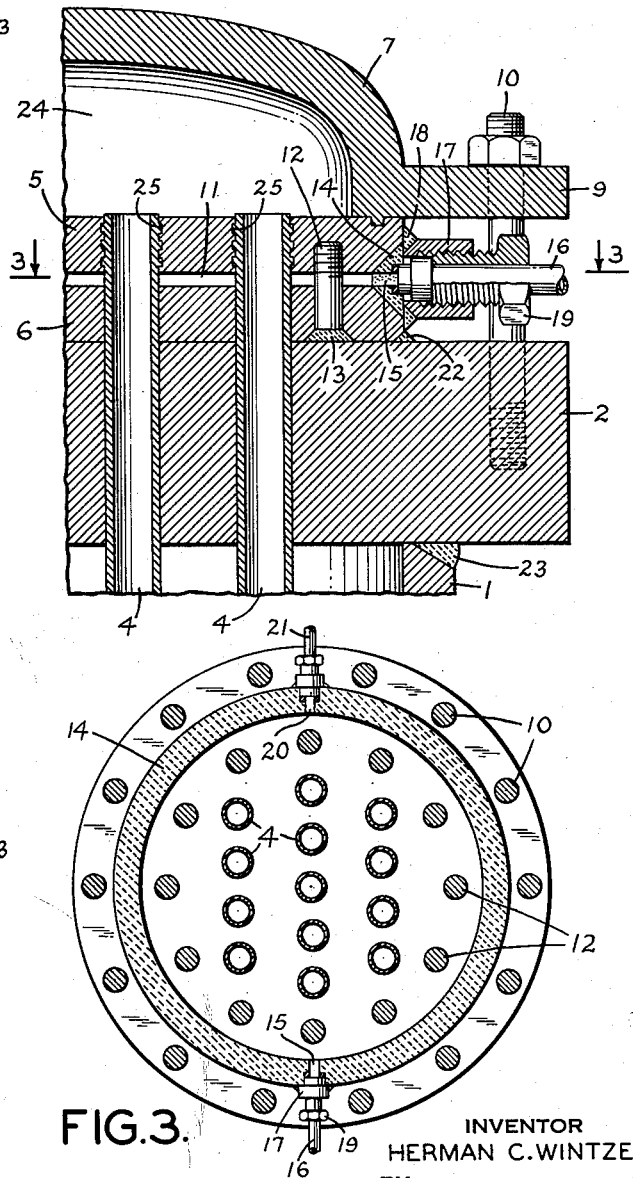
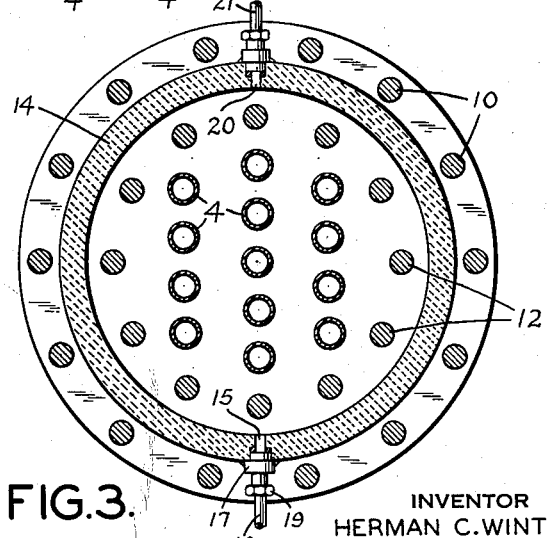
INVENTOR
HERMAN C. WINTZER
BY
Charles W. Brown
ATTORNEY 
United States Patent Office 3,114,415  
Patented Dec. 17, 1963

3,114,415  
SHELL AND TUBE HEAT EXCHANGERS  
Herman C. Wintzer, Chester, Va., assignor to Allied Chemical Corporation, a corporation of New York  
Filed Feb. 15, 1957, Ser. No. 640,480  
7 Claims. (Cl. 165—158)

This invention relates to improvements in the construction of shell and tube heat exchangers in which a fluid to be heated or cooled is of a corrosive nature and is to be passed in heat exchange with a heating or cooling medium under a pressure below that on the fluid. It is particularly an object of this invention to provide a type of construction of shell and tube heat exchanger especially especially suitable for use in operations in which a mixture of ammonia and carbon dioxide, particularly when water vapor is also present, is cooled and condensed to form a liquid containing ammonium carbamate or ammonium carbonate or bicarbonate. The heat exchangers of this invention are particularly suitable for use in high pressure urea synthesis or plants in which urea or urea pyrolysis products are treated at elevated temperatures, particularly when under high pressures, either to heat such products or to cool them by heat interchange with a heat transfer medium.

The corrosive nature of hot melts of ammonium carbamate, or an ammonium carbonate, especially when water is also present, towards many metals commonly available for plant equipment is well known.

It has long been known that ammonia and carbon dioxide in the form of ammonium carbamate melts can be converted into urea by heating under high pressures. For many years urea has been manufactured by this procedure. One of the difficulties encountered has been to provide materials of construction for the equipment in these plants which is in contact with the hot molten urea or ammonium carbamate or aqueous solutions of these materials. This equipment includes the synthesis vessels and the apparatus in which these materials are heated to recover unconverted ammonia and carbon dioxide or to evaporate water from the urea solutions produced.

It is also well known that by heating the aquo-ammono carbonic acid urea at even higher temperatures than those commonly employed for its synthesis from ammonia and carbon dioxide, the urea can be converted into its pyrolysis products, the main product formed being dependent upon the particular temperature and pressure conditions maintained during the heating. These pyrolysis products include numerous ammono and aquo-ammono carbonic acids, such as cyanuric acid, ammelide, ammeline, melamine, biuret and guanidine. Another member of the ammono carbonic acid group, dicyandiamide, may be converted into melamine by being heated. The treatment of any of these materials poses severe corrosion problems, and over the course of years many suggestions have been made as to suitable materials of construction for apparatus for handling the several materials of this type.

It has now been discovered that heat exchangers of conventional construction with welded joints between tubes and tube sheets, when in service for heating or cooling the aforedescribed materials generally show a localized corrosion even though built of a metal which, in other circumstances, is highly resistant to corrosion by those same materials. It is, therefore, an object of this invention to provide a novel form of construction for heat exchangers which meets all requirements for service in plants treating those materials, including resistance to corrosion by the hot materials in contact with the tubes and one or both tube sheets.

My invention makes use of any of the materials of construction which, in the forms commonly manufactured for the construction of plant equipment, are suitably resistant toward corrosion by the particular material to be treated. The invention will be particularly described in connection with the construction of a shell and tube heat exchanger for use in urea synthesis. It is applicable, however, in the construction of heat exchangers for treating melts of the ammono carbonic acids, the aquo-ammono carbonic acids or their ammonium salts, the ammonium salts of carbonic acid or any mixture of these compounds, or aqueous solutions containing at least 50% by weight of these materials. Franklin, Nitrogen System of Compounds, pages 35 and 36, defines these ammono carbonic and aquo-ammono carbonic acids and in chapters X and X1 describes numerous compounds of these types.

With specific reference, then, to the synthesis of urea: certain nickel-molybdenum-iron alloys which may also contain chromium and tungsten have been found to be especially resistant to attack by solutions and melts containing urea, with or without ammonia, carbon dioxide and water or urea pyrolysis products biuret, cyanuric acid, ammelide, ammeline, and mixtures thereof, at high temperatures and under high pressures. These alloys are characterized by containing (by weight) at least 45% nickel, 14% to 30% molybdenum, 0% to 17.5% chromium, 3% to 8% iron, and 0% to 5.5% tungsten. Preferably these alloys contain essentially (by weight) 14% to 19% molybdenum, 12% to 17.5% chromium and 3% to 5.5% tungsten together with 3% to 8% iron and at least 45% nickel, and better yet 15% to 17% molybdenum, 14.5% to 16.5% chromium, 3% to 4.5% tungsten, 4% to 7% iron, 1% to 2.5% cobalt and at least 50% nickel, preferably with 0.3% to 1% manganese, 0.4% to 1% silicon and not more than 0.08% carbon constituting the remaining essential ingredients of the alloy. As indicated by the composition of the last described alloys, in addition to the enumerated components, all of these alloys contain a fractional percentage of carbon. The carbon content usually is about 0.15% to about 0.01%. They also may contain small percentages of metals other than those named. Another alloy which is highly resistant to attack by these materials is an iron-nickel-chromium alloy containing iron, nickel and chromium substantially amounting (by weight) to 48% iron, 24% nickel, 20% chromium, molybdenum, manganese, copper and silicon in smaller percentages and about 0.07% carbon.

These alloys as supplied in the solution annealed condition by their manufacturers in the forms of tubing, plates, strips and the like for use in making heat exchangers, are highly resistant to corrosion by urea, ammonium carbamate and those urea pyrolysis products present under the conditions maintained in synthesizing urea from ammonia and carbon dioxide and recovering the urea and other materials present in the synthesis product. Nevertheless, it was found that in service under plant conditions, heat exchangers of the usual construction underwent severe corrosion at and in the neighborhood of the welded joints between tubes and tube sheets. This was highly unexpected since corrosion tests of the unwelded alloys and of test pieces containing welded joints, showed both to have a similar, high resistance to corrosion by hot melts and solutions of those materials.

I have now found that the novel construction with respect to the tubes and tube sheets in a heat exchanger to which my invention is directed, is not only mechanically serviceable for heat exchangers in urea synthesis plants, but when constructed of the alloys resistant to corrosion by the fluid products there being treated, eliminates the trouble caused by this tube-end corrosion.

The accompanying drawings show in FIG. 1 an elevation of a shell and tube heat exchanger incorporating my invention. FIG. 2 is a vertical cross-section taken along line 2—2 of FIG. 1, and FIG. 3 is a horizontal cross-section along line 3—3 of FIG. 1 and FIG. 2.

With reference to the drawings, a shell formed by tubular wall 1 welded at 23 to backing plates 2, which also serve as end closures, forms the chamber into which a heat exchange medium, steam under pressure, is introduced through inlet 3 for heating an ammonium carbamate melt flowing upwardly within tubes 4 in heat exchange with the steam. At both ends of the heat exchanger, an end of each of tubes 4 extends through an apertures in backing plate 2 and aligned apertures in plates 5 and 6. Headers 7, into which fluid conduits 8 open, cover the plates 5 and are held in fluid-tight contact with the faces of plates 5 by bolted flanges 9 through which bolts 10 pass and extend through threaded openings in backing plates 2. Chambers 24 between headers 7 and plates 5 serve to distribute to and to collect from tubes 4 the gases introduced and withdrawn, respectively, through conduits 8. The ends of tubes 4 are expanded and thus tightly held in the apertures of both plates 5 and 6 and of backing plates 2 by the expanded tube-to-tube sheet joints.

Plates 5 and 6 are spaced from each other and are welded together around their peripheries by a weld 14 to form an intervening chamber 11. The periphery of plate 6 is welded at 22 to backing plate 2. Stays 12, together with weld 14, provide support for maintaining the spacing of plates 5 and 6 against the compression forces between header 7 and backing plate 2. These stays are threaded into blind tapped holes in plates 5 and are welded to plate 6 by a weld 13. The ends of the tubes 4 expanded in the apertures of the two plates also serve to hold the spacing of the plates, and with the stays also support plates 5 against the pressure of the fluid in chamber 11, especially when there is a substantially lower pressure or no pressure on the fluid in chambers 24. For this purpose, the ends of tubes 4 are expanded into grooves 25 in the walls of the apertures in plates 5, the grooves extending in a direction transverse to the axes of the tubes.

An inlet 15 for fluid to chamber 11 is provided by drilling through weld 14 and attaching a fluid conduit 16. The connection of conduit 16 with the inlet 15 may be made in any of the manners known in the art pertaining to the construction of high pressure equipment. The particular type of connection shown in FIG. 2 comprises an internally threaded collar 17 welded at 18 to weld 14 and the edges of plates 5 and 6. By means of a compression nut 19 bearing against a flange on the end of conduit 16, the end of conduit 16 is forced into fluid-tight engagement with a gasket and a gasket seat formed by an enlargement of the hole drilled into weld 14.

The complete shell and tube heat exchanger shown in FIG. 1 contains at its lower end a duplicate arrangement of backing plate 2, header 7, fluid conduit 8, and double tube sheet comprising plates 5 and 6 with intervening chamber 11. The construction and arrangement of the elements at the lower end is as shown in FIGS. 2 and 3 with FIG. 2 inverted to show the lower ends of tubes 4 expanded in backing plate 2 and plates 5 and 6.

In my preferred construction shown in the drawing, an outlet 20 for fluid from chamber 11 is connected with a fluid conduit 21 in the same manner as inlet 15 is connected with fluid conduit 16. Conduit 21 leads to a valve not shown in the drawings. Means, not shown in the drawing, are provided for introducing water or steam under pressure through inlet 15 into chamber 11, for maintaining it in that chamber under a pressure above the pressure on the corrosive fluid passed through tubes 4. In normal operation outlet 20 is used only to initially bleed air or entrapped gases or liquid from chamber 11, and to take off samples of the fluid maintained in that chamber to guard against faulty operation of the apparatus.

For use in the synthesis of urea from ammonium carbamate, at least tubes 4 and plates 5, and headers 7 are of an alloy resistant to corrosion by the hot fluids contacted with these elements of the heat exchanger. As a matter of mechanical construction, the other elements forming the double tube sheets are of the same alloy, including plates 6, stays 12 and welds 13 and 14. Backing plates 2, in addition to serving as a part of the walls enclosing the chamber for the heat transfer medium, function as backing plates for the tube sheets to resist the high pressures of the fluids in headers 7. Plates 5 and 6 of the tube sheets may thus be constructed of relatively thin plates of the corrosion resistant metal, having insufficient strength to support the high pressures in headers 7, and backing plates 2 may be of other material and are of sufficient strength to support plates 5 and 6 against those high pressures.

When the heat exchanger constructed in accordance with my invention is in use, a fluid which is non-corrosive toward the materials of which the tube sheets, backing plates and the chamber containing the heat exchange medium are constructed, including welds 14 and 23, is introduced under pressure through inlets 15 into the chambers between the two plates of each tube sheet. The pressure on this fluid is maintained somewhat greater than the pressure on the corrosive material passed through tubes 4. Under these conditions no leakage of corrosive material past the joints between the tubes and plates of the tube sheet will occur. This corrosive fluid cannot reach either the weld around the periphery of the tube sheet or the welds between stays 12 and plates 6. Nor can it reach stays 12 or backing plate 2. Accordingly, these need not necessarily be of a metal resistant to corrosion by the corrosive fluid passed through the heat exchanger. Since fluid may leak from chamber 11 into chambers 24 and into the chamber containing the heat exchange medium, this fluid should be compatible with both the material passed through chambers 24 and tubes 4 and with the heat exchange medium. In heating or cooling the amination products of carbon dioxide, for which my apparatus is especially suitable, where steam or water is used as the heat exchange medium, it is preferred to use steam or water in chamber 11.

As pointed out above, my invention is especially applicable in the field where fluids containing urea or other amination products of carbon dioxide are to be heated to high temperatures or to be cooled from high temperatures and are under high pressures. In addition to construction of the autoclaves in which molten ammonium carbamate is heated under pressure to form urea, or those in which urea, biuret or dicyandiamide are heated under pressure to form melamine, my invention is useful in the coolers in which the hot reaction products of these pyrolysis processes are cooled, and in the evaporators in which solutions of urea or melamine or any of their pyrolysis products are evaporated to concentrate the solutions. In each case, the appropriate corrosion-resistant metal is used in the construction of the tubes and tube sheets.

The particular construction of the heat exchanger as a whole may of course be suitably varied according to the conditions of service. Thus, the specific construction described above is especially suitable for the high pressure autoclaves in which urea or melamine are synthesized, and for heat exchangers in which the products of these syntheses under high pressure are heated or cooled. When my invention is employed in the construction of evaporators for the concentration of solutions of urea or melamine under relatively low pressures, tube sheets of corrosion-resistant material themselves would normally be constructed with sufficient mechanical strength to serve as the end closures for the heating chamber.

I claim:

1. In a shell and tube heat exchanger of the type in which the tube ends are fixed in apertures in a tube sheet, wherein a fluid of the group consisting of melts of the ammono carbonic acids, the aquo-ammono carbonic acids and their ammonium salts, the ammonium salts of carbonic acid, and mixtures of these compounds and aqueous solutions containing at least 50% by weight of these compounds, is passed through the tubes under high pressure and is heated by heat exchange with a heating medium within the shell under a pressure lower than that of the corrosive fluid, a tube sheet comprising two spaced plates welded together around their peripheries to form a central chamber lying between the plates, aligned apertures in said plates through which an end of each of said tubes passes, transversing both plates and the intervening chamber, and is expanded in the apertures of said plates, said tubes and the plate of said tube sheet contacted by said corrosive fluid being composed of an alloy resistant to corrosion by said corrosive fluid from the group consisting of the nickel-molybdenum-iron alloys characterized by containing (by weight) at least 45% nickel, 14% to 30% molybdenum, 0% to 17.5% chromium, 3% to 8% iron and 0% to 5.5% tungsten and a fractional percentage of carbon, and the iron-nickel-chromium alloys characterized by containing (by weight) substantially 48% iron, 24% nickel, 20% chromium, molybdenum, manganese, copper and silicon in smaller percentages and about 0.07% carbon, an inlet for fluid to said chamber, and means for introducing a fluid substantially non-corrosive toward said plates, weld and shell through said inlet and into said chamber, and for maintaining the fluid in the chamber under a pressure greater than that of the corrosive fluid in contact with said tubes and tube sheet.

2. The apparatus of claim 1 in which a metal backing plate forms an end closure for the shell and is in supporting contact with one of the plates of said tube sheet, and apertures in said backing plate aligned with the apertures of the plates constituting the tube sheet through which an end of each of said tubes passes and transverses the backing plate, both plates of the tube sheet and the intervening chamber and is expanded in the apertures of both plates of the tube sheet.

3. The apparatus of claim 2 wherein the backing plate is welded to the plate of the tube sheet with which it is in contact, and a header of a metal resistant to corrosion by the corrosive fluid is in fluid-tight contact with that face of the plate of the tube sheet which is contacted by the corrosive fluid.

4. The apparatus of claim 2 wherein the tubes and the plate of the tube sheet contacted by the corrosive fluid are constructed of an alloy substantially composed of (by weight) at least 45% nickel, 14% to 30% molybdenum, 0% to 17.5% chromium, 3% to 8% iron, 0% to 5.5% tungsten and a fractional percentage of carbon.

5. The apparatus of claim 2 wherein the plates of the tube sheet are supported by stays in their spaced relationship to each other against compression forces holding the tube sheet between the header and the backing plate, and the ends of the tubes are expanded into grooves in the walls of the apertures in the plate of the tube sheet which is in contact with the corrosive fluid, which grooves extend in a direction transverse to the axes of the tubes.

6. The apparatus of claim 2 wherein the tubes and the plate of the tube sheet contacted by the corrosive fluid are composed of an alloy containing substantially 48% iron, 24% nickel, 20% chromium, molybdenum, manganese, copper and silicon in smaller percentages and about 0.07% carbon.

7. The apparatus of claim 2 wherein the tubes and the plate of the tube sheet contacted by the corrosive fluid are constructed of an alloy substantially composed of (by weight) at least 45% nickel, 14% to 19% molybdenum, 12% to 17.5% chromium, 3% to 8% iron, 3% to 5.5% tungsten and a fractional percentage of carbon.

References Cited in the file of this patent

UNITED STATES PATENTS

| | | |
|---|---|---|
| 1,589,646 | Hicks | June 22, 1926 |
| 2,152,266 | McNeal | Mar. 28, 1939 |
| 2,200,208 | Parsons | May 7, 1940 |

FOREIGN PATENTS

| | | |
|---|---|---|
| 273,605 | Great Britain | July 12, 1927 |

OTHER REFERENCES

"Metals Handbook," published by American Society for Metals, 1939 edition (page 41, para. 21 and page 43, para. 40 relied on).

"Engineering Alloys," published by American Society for Metals, revised 1946. (Pages 148, 449, 567–578 relied on.)